United States Patent [19]
McCarty et al.

[11] Patent Number: 5,944,798
[45] Date of Patent: Aug. 31, 1999

[54] SYSTEM AND METHOD FOR ARBITRATED LOOP RECOVERY

[75] Inventors: James F. McCarty, Spring; William C. Galloway, Houston, both of Tex.

[73] Assignee: Compaq Computer Corp., Houston, Tex.

[21] Appl. No.: 08/802,673

[22] Filed: Feb. 19, 1997

[51] Int. Cl.$^6$ .................................................... G06F 11/00
[52] U.S. Cl. ................................. 709/251; 370/216; 714/4
[58] Field of Search .................................. 370/222, 216; 395/182.02, 181, 200.81

[56] References Cited

U.S. PATENT DOCUMENTS

| | | | |
|---|---|---|---|
| 5,175,822 | 12/1992 | Dixon et al. | 710/9 |
| 5,237,660 | 8/1993 | Weber et al. | 710/57 |
| 5,313,323 | 5/1994 | Patel | 359/115 |
| 5,471,639 | 11/1995 | Harrington | 710/22 |
| 5,485,576 | 1/1996 | Fee et al. | 714/4 |
| 5,515,361 | 5/1996 | Li et al. | 370/222 |
| 5,535,035 | 7/1996 | DeFoster et al. | 359/161 |
| 5,544,326 | 8/1996 | Pease et al. | 710/129 |
| 5,546,550 | 8/1996 | Carter | 710/129 |
| 5,757,642 | 5/1998 | Jones | 364/134 |
| 5,809,328 | 9/1998 | Nogales et al. | 710/5 |
| 5,812,754 | 9/1998 | Lui et al. | 714/6 |

OTHER PUBLICATIONS

Clint Jurgens; "Fibre Channel: A Connection to the Future"; Computer Magazine, vol. 28, Issue 8; pp. 88–89. Aug. 1995.

"Ultra SCSI White Paper"; *Quantum;* Nov. 25, 1996; http://www.quantum.com/products/whitepapers/ultraSCSI.html; pp. 1–7.

"Fibre Channel for the Long Run"; Newsletter; *Interphase ICON–Technical news;* Nov. 25, 1996 http://www.iphase.com/Public/Events/ICON/Fall/Tech News.html; pp. 1–3.

"Fibre Channel Loop Community" Newsletter; Nov. 26, 1996; http://www.symbios.com/fclc/fc21cen.html; pp. 1–7.

Frymoyer, Edward J.; "Fibre Channel Fusion: Low Latency, High Speed"; Hewlett–Packard Co., Feb. 1995; http://www.data.com/Tutorials/Fibre–Channel–Fusion.html; Nov. 25, 1996; pp. 1–9.

"Why Fibre Channel, why ATM? Competitors or Complementary?"; *Ancot;* Nov. 26, 1996; http://www.anco.com/modiscuss.html;pp. 1–3.

Sutton, Tim and Webb, David; "Fibre Channel: The Digital Highway Made Practical"; *Seagate,* Oct. 22, 1994; http://www.maxcom.nl/seagate/wpaper/fibrchan.html; Nov. 25, 1996; pp. 1–7.

Goralski, Walter and Kessler, Gary; "Fibre Channel: Standard, Applications, and Products"; Dec. 1995; http://www.hill.com/personnel/gck/fibre channel.html; Nov. 25, 1996, pp. 1–8.

"Input/Output Buses"; Nov. 25, 1996; http://www.sanders.com/hpc/ArchGuide/Elements/Commune/IO.html; pp. 1–3.

"SCSI Description" Quantum Grand Prix SCSI Manual; Chapter 6–6.1; Nov. 26, 1996; http://www.quantum.com/products/manuals/gp–scsi–manual/chap6.1.html; pp. 1–2.

"SCSI Description" Quantum Grand Prix SCSI Manual; Chapter 6.2–6.2.1; Nov. 26, 1996; http://www.quantum.com/products/manuals/gp–scsi–manual/chap6.2.1.html; one page.

(List continued on next page.)

*Primary Examiner*—Parshotam S. Lall
*Assistant Examiner*—Kenneth R. Coulter
*Attorney, Agent, or Firm*—Jenkens & Gilchrist, P.C.

[57] ABSTRACT

A computer system with a plurality of devices compatible with the Fibre Channel Protocol. The computer system is provided with the capability to recover from a loop hang condition resulting from an unresponsive communication link in an Arbitrated Loop. This capability is realized by providing a sense mechanism for detecting a no-change condition in the states associated with a controller arranged in the Arbitrated Loop.

9 Claims, 5 Drawing Sheets

OTHER PUBLICATIONS

"SCSI Description" Quantum Grand Prix SCSI Manual; Chapter 6.2.2–6.2.3; Nov. 26, 1996; http://www.quantum.com/products/manuals/gp–scsi–manual/chap6.2.3.html#6; one page.

"SCSI Description" Wuantum Grand Prix SCSI Manual; Chapter 6.2.4; Nov. 26, 1996; http://www.quantum.com/products/manual/gp–scsi–manual/chap6.2.4.html; one page.

"Mapping SCSI to Fibre Channel"; *Emulex Fibre Channel Products;* Nov. 25, 1996; http://www.emulex.com/fc/scsi–mapping.html; pp. 1–2.

"Interphase Announces PCI Interface for HP's Tachyon Fibre Channel Controller Chip" News Release; Interphase Corporation; Nov. 25, 1996; http://www.iphase.com/Public/PressReleases/1996/TSI–PCI.html' pp. 1–2.

SYSTEM AND METHOD FOR ARBITRATED LOOP RECOVERY

BACKGROUND OF THE INVENTION

1. Technical Field of the Invention

The present invention relates to channel and network communication systems and processes and, in particular, to a system and method for recovering from an unresponsive Arbitrated Loop in a Fibre Channel environment.

2. Description of Related Art

There are two kinds of protocols for device communication: channels and networks. Channels, for example, between a master host computer and a slave peripheral device, are designed to transport a large amount of data at very high speeds over relatively small distances with little software overhead once data transmission commences. A channel provides a direct or switched point-to-point connection between a master and a slave that is hardware-intensive. Networks, on the other hand, usually interface many users and support many transactions, sharing a plurality of hosts and system resources, over medium to large distances. In network connections, higher overhead is generally acceptable as long as high connectivity is achieved.

The Fibre Channel Protocol ("FCP") is a new generation protocol that combines the best of these two disparate methods of communication in a single Open-Systems-Interface-like (OSI-like) stack architecture. Essentially, the Fibre Channel ("FC") is a multi-topology, multi-layer stack with lower-layer-protocols ("LLPs") for controlling the physical transport characteristics and upper-layer-protocols ("ULPs") for mapping LLP communication to and from higher-level software structures that are compatible with an Operating System. These ULPs include both channel and network protocols such as Intelligent Peripheral Interface ("IPI"), Small Computer System Interface ("SCSI"), and Internet Protocol ("IP"), among others.

It is well-known that devices that engage in either channel or network communication may be categorized as "initiators" or "targets" or both, depending upon their functionality. Certain specific functions are assigned to either an initiator or a target: (i) an initiator can arbitrate for the communication path and select a target; (ii) a target can request the transfer of command, data, status, or other information to or from the initiator, and (iii) in some instances, a target can arbitrate for the communication path and reselect an initiator to continue a transaction.

Devices that are operable with the Fibre Channel Protocol, irrespective of whether they are initiators or targets, typically include a controller (hereinafter an "FC controller") that embodies the functionality of some of the middle-layers of the FCP stack. Furthermore, FC controllers may involve a "controller chip" such as, for example, the Tachyon™ integrated circuit offered by Hewlett Packard Company. As part of the middle-layer FCP functionality, these FC controllers monitor the state of information transmissions over the FC communication links and are designed to take appropriate recovery measures should an unresponsive communication link be encountered. However, the existing FC controllers typically require the re-booting of the initiators and power-cycling of the targets as part of their recovery mechanisms. It can be appreciated that the re-booting and power-cycling of the devices increases the down-time for communication links to unacceptable levels in high-performance, leading-edge systems.

SUMMARY OF THE INVENTION

The present invention overcomes the above-identified problems as well as other shortcomings and deficiencies of existing technologies by providing a method for managing an Arbitrated Loop in a computer system with a Fibre Channel (FC) communication environment, which environment includes a plurality of FC devices disposed in the Arbitrated Loop, each FC device including at least a controller, the method for managing comprising the steps of: sensing an unresponsive state associated with the Arbitrated Loop; responsive to the sensing step, re-initializing the Arbitrated Loop; and if the re-initializing step was unsuccessful, resetting the controller and subsequently re-initializing the Arbitrated Loop.

The present invention further provides a system for recovering from a loop hang condition resulting from an unresponsive state associated with an Arbitrated Loop, which system comprises: sense means for sensing an unresponsive state associated with the Arbitrated Loop; means for re-initializing the Arbitrated Loop responsive to a sense signal provided by the sense means; and reset means for resetting the controller, the reset means being actuatable upon detecting a failure associated with the means for re-initializing.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
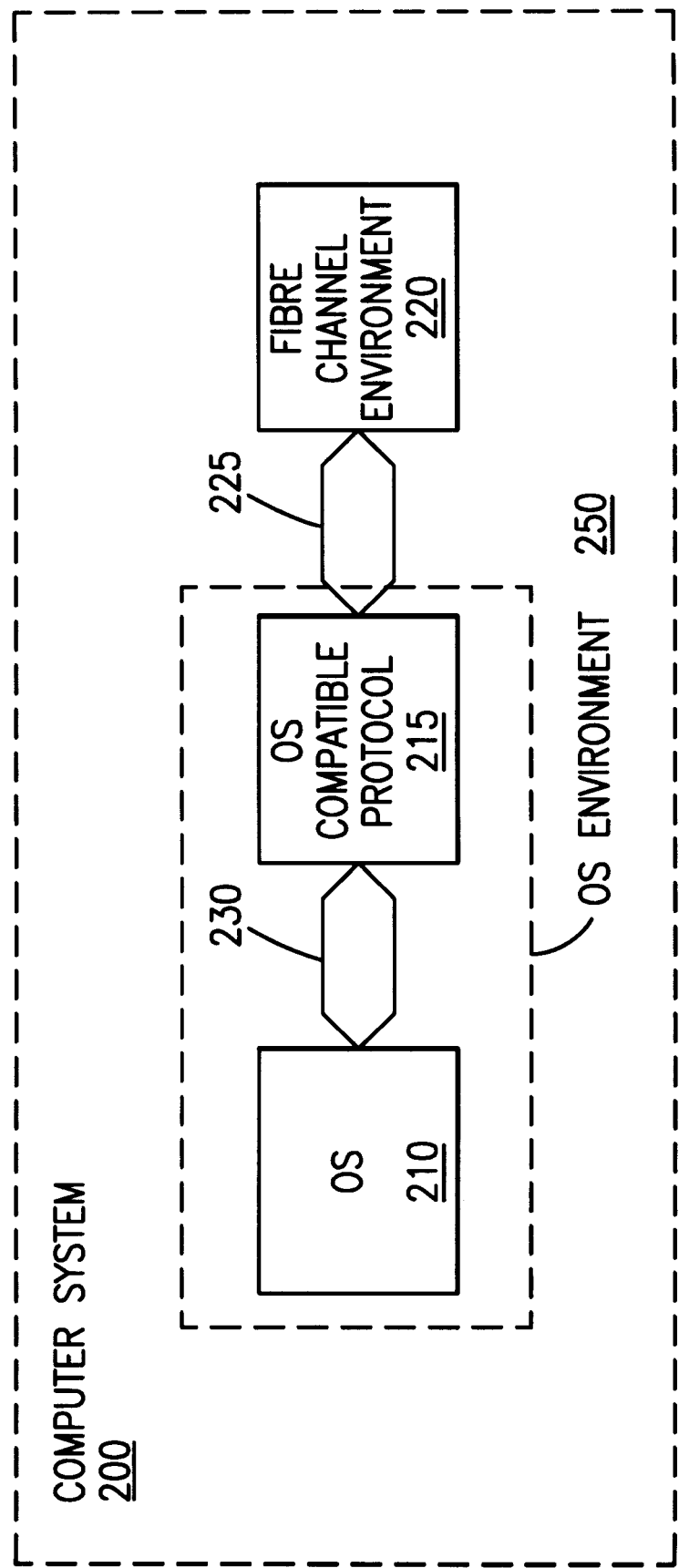
FIG. 1 illustrates a block diagram of an exemplary computer system wherein the teachings of the present invention may be practiced.

Referring now to the drawings wherein like or similar elements are designated with identical reference numerals throughout the several views, and wherein the various elements depicted are not necessarily drawn to scale, and, in particular, to FIG. 1, there is shown a block diagram of an exemplary computer system 200 wherein the teachings of the present invention may be practiced. As can be appreciated by those skilled in the art, the computer system 200 is represented herein in its functional aspects. An Operating System ("OS") 210 is operably provided in the computer system 200 to control the information flow associated therewith. The OS 210 may be a Disk Operating System ("DOS") or a Network Operating System ("NOS") such as, for example Windows NT® or NetWare®, as may be appropriate depending upon whether the computer system 200 is arranged in a network configuration.

The OS 210, moreover, is operable with at least a conventional channel communication interface such as, for example, the SCSI standard. The exemplary OS 210 may further be provided with such functional structures that would enable interoperability with conventional network communication protocols such as, for example, the Internet Protocol ("IP").

Continuing to refer to FIG. 1, the exemplary OS 210 communicates with an OS-compatible channel or network communication protocol/interface 215 via an upper_level_ communication path 230. It should be appreciated that the upper_level_communication path 230 in the functional block representation of the exemplary computer system 200 may encompass such OS-software structures as communication protocol drivers, for example, the SCSI protocol drivers or IP protocol drivers. The exemplary OS 210 and the OS-compatible interface/protocol 215 together constitute what will be henceforth referred to as an OS environment 250 in the computer system 200. Reference numeral 220 refers to a Fibre Channel ("FC") environment which may encompass a plurality of FC devices operable in accordance with the teachings of the present invention in addition to known Fibre Channel Protocol ("FCP") architecture elements.

Still continuing to refer to FIG. 1, it can be appreciated that most Operating Systems including, for example, the OS 210, are not able to communicate "directly" with the devices disposed in the FC environment 220. Therefore, in order to operably include and harness the benefits of the FC environment 220 in an exemplary computer system 200, a link path 225 is provided between the FC environment 220 and the OS-compatible communication interface 215.

Figure 2:
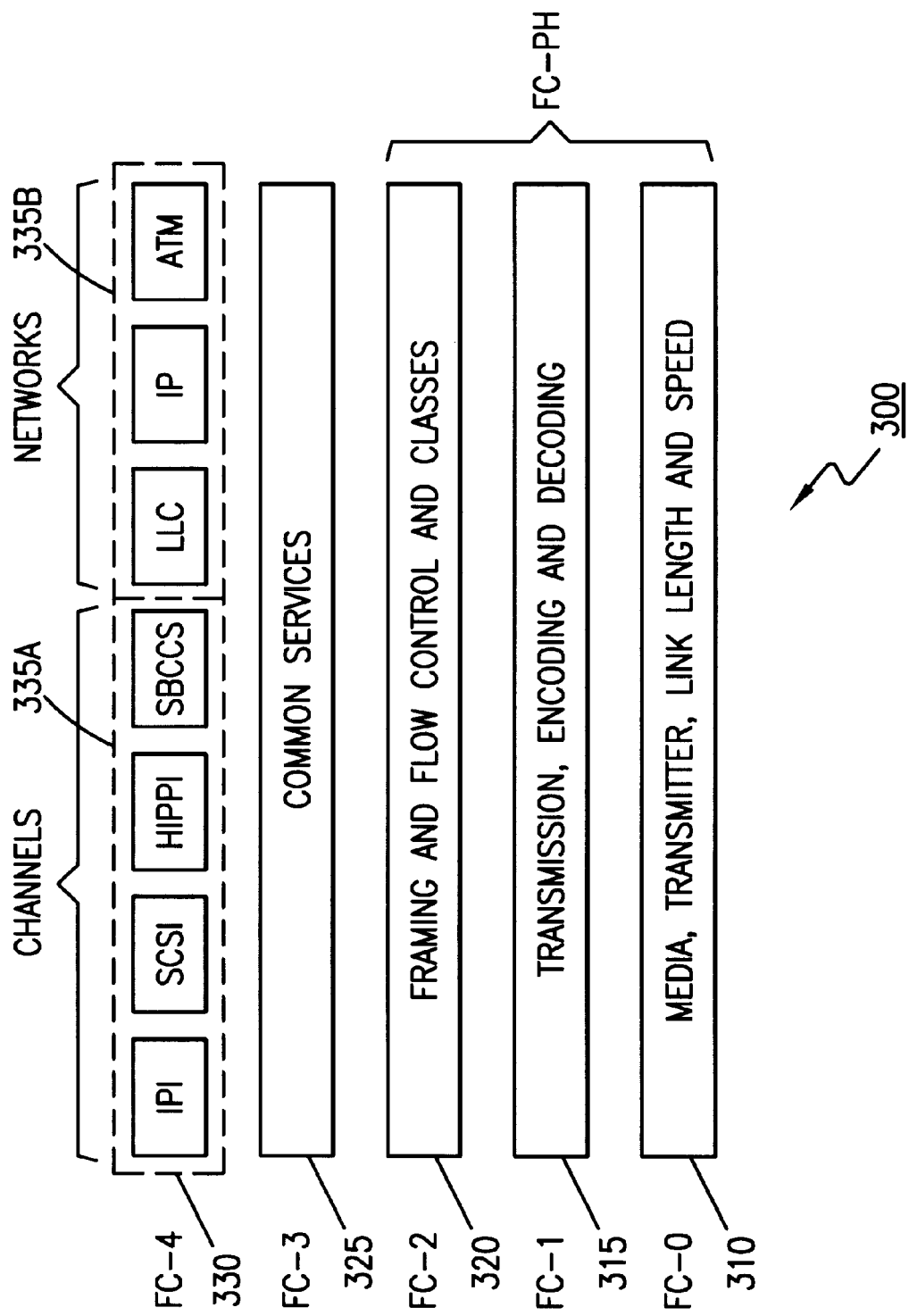
FIG. 2 depicts a diagrammatic representation of the Fibre Channel (FC) Protocol stack.

Referring now to FIG. 2, a diagrammatic representation of the FCP stack architecture is shown generally at 300. As can be readily appreciated, the FCP architecture is structured as a hierarchical set of protocol layers, much like the Open Systems Interface ("OSI") stack. The three bottom layers of the FC stack (layer 310, labeled as FC-0, through layer 320, labeled as FC-2) form what is known as the Fibre Channel Physical Standard ("FC-PH"). This Standard defines all the physical transmission characteristics of a Fibre Channel environment including, for example, the FC environment 220 (shown in FIG. 1). The remaining layers (layer 325, labeled as FC-3 and layer 330, labeled as FC-4) handle interfaces with other network protocols and applications. Unlike the existing Local Area Network ("LAN") technologies such as Ethernet and Token Ring, FC keeps the various functional layers of the stack 300 physically separate. As can be appreciated, this physical separation enables implementation of some stack functions in hardware and others in software or firmware.

The layer 310, FC-0, is the lowest functional layer of the FC architecture and describes the physical characteristics of the link connections among the plurality of FC devices disposed in the FC environment 220 (shown in FIG. 1). FC-0 supports a basic rate of 133 Mbaud, the most commonly used speed of 266 Mbaud, as well as 531 Mbaud and 1.062 Gbaud. However, because of the overhead involved in establishing and maintaining link connections, the actual data throughput is somewhat lower: 100 Mbit/s for 133 Mbaud, 200 Mbit/s for 531 Mbaud, 400 Mbit/s for 531 Mbaud, and 800 Mbit/s for 1.062 Gbaud. Further, FC-0 supports a wide range of physical cabling, including single-mode or multimode fiber-optic cable, coaxial cable, and shielded twisted pair ("STP") media. Each of these cabling elements supports a range of data rates and imposes specific distance limitations, but FC can mix all of them within the same FC environment such as the FC environment 220 shown in FIG. 2. For instance, single-mode optical fiber could be used for distances up to 10 km; multimode fiber, at 200 Mbit/s, could be used for distances up to 2 km; and STP, which supports 100 Mbit/s, may be used for up to 50 meters.

The layer 315, FC-1, defines the transmission protocol, including the serial encoding and decoding rules, special characteristics, and error control. FC-1 uses an 8B/10B block code, where every 8 data bits are transmitted as a 10-bit group with two extra bits for error detection and correction, known as disparity control. The 8B/10B scheme supplies sufficient error detection and correction to permit use of low-cost transceivers, as well as timing recovery methods to reduce the risk of radio-frequency interference and ensure balanced, synchronized transmissions.

The third layer of the FC-PH, layer 320, FC-2 describes how data is transferred between the FC devices, each FC device being disposed at a "Node," and includes the definition of the frame format, frame sequences, communications protocols, and service classes. The basic unit of data transmission in Fibre Channel is a variable-sized frame. Frames can be up to 2,148 bytes in length, comprising a payload of up to 2,048 bytes; 36 bytes of overhead that provides framing, source and destination port addressing, service type, and error detection information; and up to 64 bytes of additional optional overhead for other miscellaneous information about the user data, that is, the payload. A single higher layer (that is, the upper layers in the stack 300) protocol message may be larger than a frame's payload capacity, in which case the message will be fragmented into a series of related frames called a sequence.

Continuing to refer to FIG. 2, FC-2 layer can be appreciated as the main "workhorse" of the FCP stack 300. It frames and sequences data from the upper layers (layers 325 and 330) for transmission via the FC-0 layer; it accepts transmissions from the FC-0 layer and reframes and resequences them, if necessary, for use by the upper layers 325 and 330. In addition to defining a full duplex transmission path between two nodes, the FC-2 layer also provides essential traffic management functions, including flow control, link management, buffer memory management, and error detection and correction. An important feature of the FCP stack 300 is that the FC-2 layer defines four classes of service to meet a variety of communication needs. Class 1 Service defines hard-wired or circuit-switched connections that are dedicated, uninterruptible communication links. This service provides exclusive use of the connection for its duration (sometimes called a "selfish connection"). Class 1 Service is designed for time-critical, "non-bursty" dedicated links, such as those between two supercomputers. Class 2 Service is a connectionless, frame-switched transmission that guarantees delivery and confirms receipt of traffic. Like conventional packet-switching technologies such as frame relay, Class 2 switching is performed on the FC data frame rather than on a connection. No dedicated connection is established between the nodes; each frame is sent to its destination over any available route. When congestion occurs in Class 2 traffic, the frame is retransmitted until it successfully reaches its destination. Class 3 Service defines one-to-many connectionless frame-switched service that is similar to Class 2 Service, except that it has no delivery guarantee or confirmation mechanism. It can be appreciated that Class 3 transmissions are faster than Class 2 transmissions because they do not wait for confirmation. But if a transmission does not arrive at its destination, Class 3 Service does not retransmit. This service is most often used for real-time broadcasts that cannot wait for acknowledgment but are not sufficiently time-critical to warrant Class 1 Service. It is also used for applications that can tolerate lost frames. Class 4 Service is a connection-based service that offers guaranteed fractional bandwidth and guaranteed latency levels.

The FC-3 layer, layer 325, provides a common set of communication services of higher layer protocols above the FC-PH level. These additional services may include, for example, mechanisms for multicast and broadcast data delivery, "hunt" groups wherein more than one target node can respond to a given initiator node, and multiplexing multiple higher layer protocols and the FC-PH.

The top layer, layer 330, of the FCP stack 300 is the FC-4 layer. It defines the higher layer applications that can operate over an FC infrastructure such as, for instance, the FC environment 220 shown in FIG. 2. The FC-4 layer provides a way to utilize existing channel and network protocols over Fibre Channel without modifying those protocols. Accordingly, the FC-4 layer acts like a protocol convergence layer so that the FC node appears to provide the exact lower-layer transport services that the higher-layer channel or network protocol requires. This convergence function may require that the FC-4 layer provide additional services such as buffering, synchronization, or prioritization of data. It can be appreciated that the FC-4 functionality is encompassed in the link path 225 disposed between the FC environment 220 and the OS-compatible interface 215 of the exemplary computer system 200, shown in FIG. 1.

Still continuing to refer to FIG. 2, various FC-4 level mappings have been specified for a number of higher layer channel and network communication protocols, including: Intelligent Peripheral Interface ("IPI"); SCSI; High-Performance Parallel Interface ("HIPPI"); Single Byte Command Code Set ("SBCCS"); Logical Link Control ("LLC"); IP; and Asynchronous Transfer Mode ("ATM") Adaptation Layer ("AAL").

Current FC controllers typically embody the functionalities of the layers 315 and 320 (FC-1 and FC-2). On the other hand, a host computer system, such as the exemplary computer system 200 shown in FIG. 1, would be responsible for the upper-layers (FC-3 and FC-4). A Physical Link Module ("PLM") such as, for example, a Gigabit Link Module ("GLM") would implement the bottom-most layer 310 (FC-0).

Figure 3A:
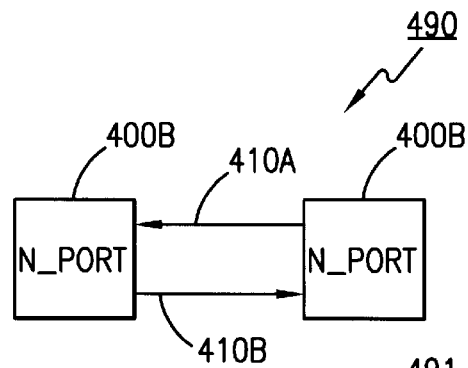
FIGS. 3A, 3B, and 3C depict block diagrams of the three topological configurations available for Fibre Channel Nodes.
Figure 3B:
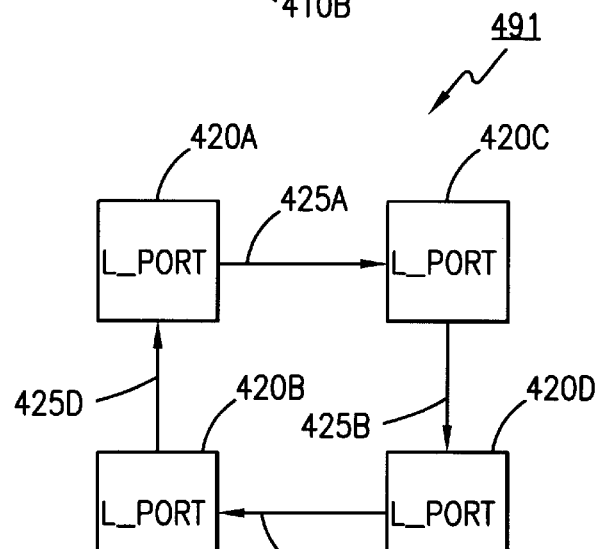
Figure 3C:
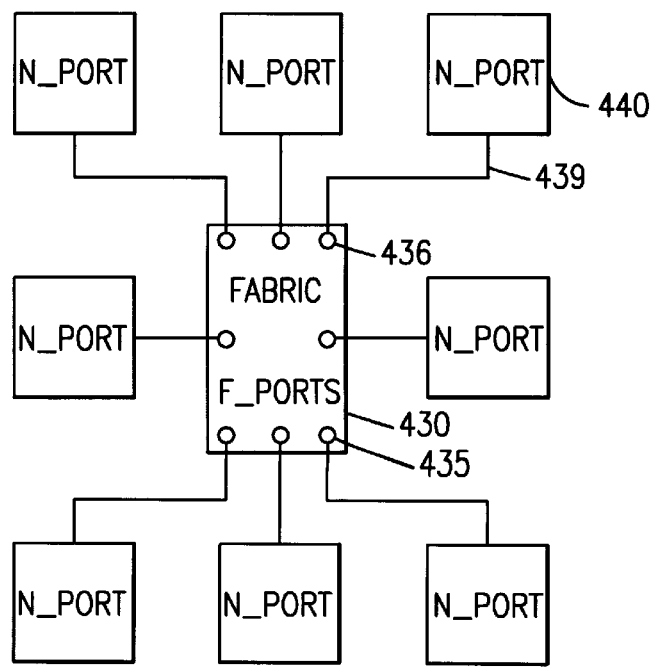

Referring now to FIGS. 3A–3C, three exemplary topological configurations are shown, generally at 490, 491, and 492, respectively, into which the FC Nodes may be arranged. A Node is an entity, system, or device that has the capability to process the ULPs, the FC-3, and some of the FC-2 functions. A Node may contain one or more ports, commonly known as Node Ports or N_Ports. An N_Port is a hardware entity within a Node that supports the FC-PH. It may act as an originator (that is, an initiator), a responder (that is, a target), or both. Hereinafter, the terms Node, device and Port will be used somewhat interchangeably for the purpose of the present invention.

Reference numeral 490 refers to a point-to-point topology which utilizes communication links 410A, 410B to provide a full duplex transmission path between any two FC Nodes, denoted here as N_Ports 400A and 400B. This connection topology provides the maximum possible bandwidth and lowest latency since there are no intermediate devices/Nodes.

Reference numeral 492 refers to a switched fabric topology where each FC device or Node (N_Port) is connected to an F_Port that is part of a fabric, for example fabric 430, and receives a non-blocking data path to any other connection on the fabric. An F_port is the access point of the fabric for physically connecting to another Node. The fabric 430 may be a switch or series of switches and is responsible for routing between Nodes, error detection and correction, and flow control. The operation of the fabric 430 is independent of the higher layer communication protocols, largely distance-insensitive, and may be based on any technology.

Communication paths, for example, path 437, provide a bidirectional connection between a Node, N_Port 440 and a fabric port (F_Port) 436. The switched fabric topology 492 provides the maximum connection capability and total aggregate throughput of all the three FC topologies. It may be appreciated that the switched fabric topology 492 provides the capability to interconnect large number of systems; to sustain high bandwidth requirements; to match data rates between connections of different speeds; and to match different cabling elements.

Reference numeral 491 denotes a loop topology known in the art as an Arbitrated Loop ("AL") pursuant to a connection standard referred to as the FC-AL standard. The loop topology 491 interconnects a plurality of FC devices or Nodes (denoted as loop ports or L_Ports) such as, for example, L_Ports 420A through 420D, via unidirectional links, for example, links 425A through 425D. Thus, this connection arrangement enables each device to use the loop topology 491 as a point-to-point connection between a sender and a receiver, irrespective of any intermediate devices disposed therebetween which merely act as "repeaters."

The arbitrated loop 491 provides a low-cost means of attaching multiple devices without the need for hubs or switches. Although only four L_Ports are shown in FIG. 4B, the loop provides shared bandwidth for up to 127 L_Ports. Each L_Port requests use of the loop when it needs to communicate with another port; if the loop is free, the requesting port sets up a bidirectional connection with the destination port. The loop protocol permits an L_Port to continuously arbitrate to access the transmission medium to transmit to another L_Port; a fairness algorithm ensures that no L_Port gets blocked from accessing the loop. Once a connection is established, it can then deliver any class of service appropriate to the traffic between the two L_Ports.

As is known in the art, only one pair of L_Ports may communicate at one time. When these L_Ports relinquish control of the loop, another point-to-point connection between two L_Ports may be established. Further, the entire loop may be attached, in turn, to a FC switch fabric port via what is known as an FL_Port, or directly to a single host system via an NL_Port.

Because the presently preferred exemplary embodiment of the present invention encompasses an FC-AL topology, such as the loop topology 491, the general operation of this nodal configuration will be described in greater detail hereinbelow.

It is known that the FC-AL standard allows each FC device to negotiate for an Arbitrated Loop Physical Address (AL_PA) in a Loop Initialization process. While participating on an Arbitrated Loop, the FC devices must log in to each other before commencing a loop transaction. The login procedure is the initial procedure all communicating Nodes go through to establish service parameters and a common operating environment. One of the examples of service parameters is a "credit" limit, which represents the maximum number of outstanding frames that can be transmitted by a Port without causing a buffer overrun at the receiving Port. As can be seen, credit is a flow control mechanism that throttles link traffic by limiting the number of frames each originator Port can send. In conventional FC controllers, two types of credit are typically used: buffer-to-buffer credit ("BB_Credit") and end-to-end credit ("EE Credit")

If a device not logged in to another device, it will discard any frames it receives from that device until it is logged in. Since an initiator or driver must be able to manage the target device with which it is communicating, the initiator keeps track of an FC-specific identity triplet for that target device. This FC-specific ID triplet comprises a target's Node_Name, its Port_Name, and its AL_PA. While the AL_PA is dynamically assigned upon a loop reset, the Node_Name and Port_Name are formed from the device's unique World_Wide_Name.

When the devices come up onto an Arbitrated Loop upon a reset, they configure their AL_PAs in one of three ways in the Loop Initialization step: via a Soft Address scheme, or Preferred Address scheme, or a Hard Address scheme. In a Soft Address scheme, the device does not care what AL_PA it is assigned. Rather, it simply accepts the first free AL_PA available.

In a Preferred Address scheme, the FC device would like to be assigned a particular AL_PA. However, if a desired AL_PA is unavailable for some reason, it will accept whichever AL_PA that is free and available. For example, after a device is assigned a specific AL_PA for the first time upon "global" system initialization following the loading of the OS, that device will continue to request for that AL_PA upon subsequent loop resets. However, once this device goes off-line from the Arbitrated Loop, it will lose its ability to "prefer" that AL_PA and must resort to accepting the first free AL_PA that is available.

In a Hard Address scheme, the FC device can only operate at a particular AL_PA. According to the Loop Initialization Protocol ("LIP") in the FC-AL Standard, which handles the configuration of the AL_PAs, this method of address configuration takes precedence over the first two methods, namely, the Soft Address and Preferred Address schemes.

After all AL_PA assignment issues have been resolved, the FC-devices that act as initiators send out to all valid loop addresses a plurality of what are known as Link Service Frames which comprise, among other things, the LOGIN ("PLOGI") Frames, in order to discover what devices are on the Arbitrated Loop. If a device accepts the LOGIN Frames from an initiator, it will respond by transmitting in turn one or more ACKNOWLEDGMENT ("ACK") Frames to the initiator. Then, responsive to these ACK Frames, a structure in the initiator known as the Fibre Channel Manager ("FCMNGR") will transmit a PROCESS LOGIN REQUEST ("PRLI") to the responding device which, subsequently, identifies itself as being a target, an initiator, or both.

Figure 4:
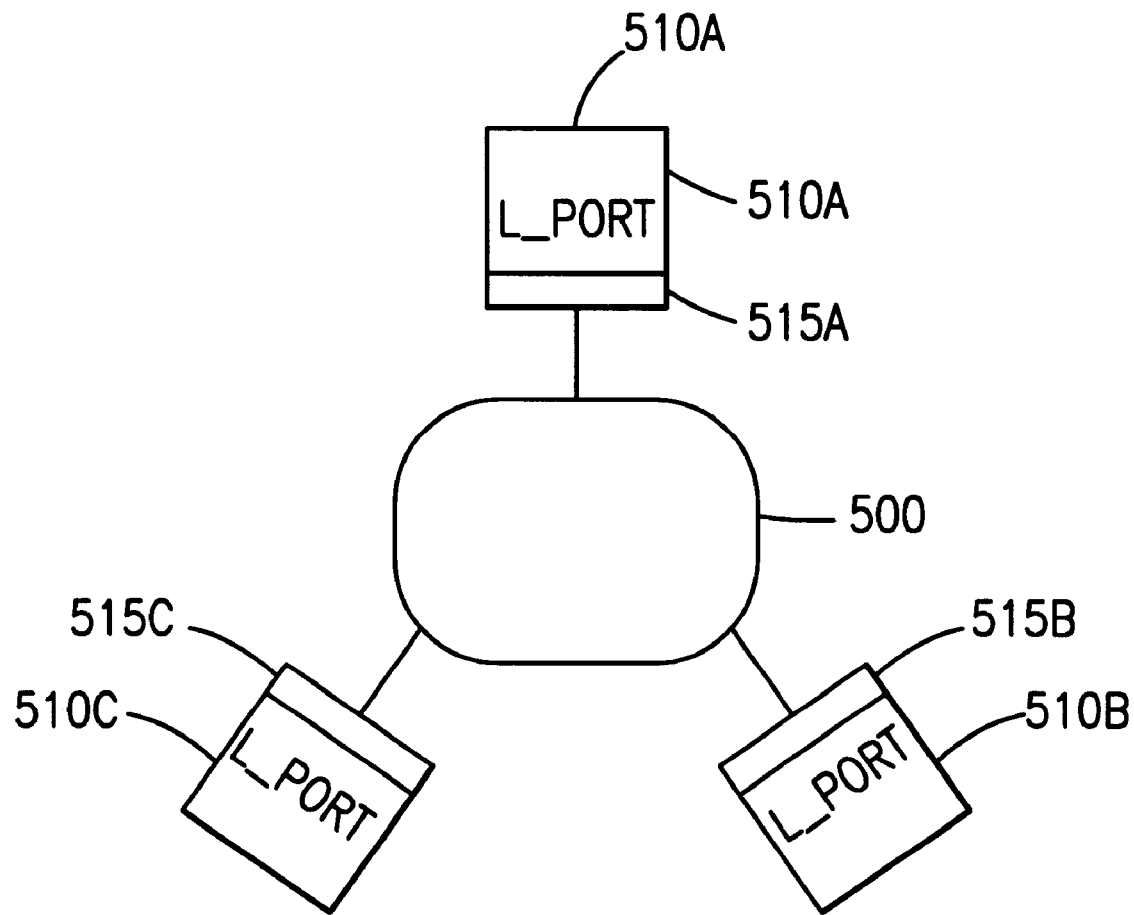
FIG. 4 illustrates an exemplary embodiment of an Arbitrated Loop with FC controllers in accordance with the teachings of the present invention.

Referring now to FIG. 4, therein is depicted an exemplary embodiment of an Arbitrated Loop 500 comprising three L_Ports (510A through 510C) with FC controllers (515A through 515C), respectively coupled thereto. The L_Port 510C functions as an initiator, whereas the L_Port 510B functions as the corresponding target. The exact functionality of the third Port, L_Port 510A, need not be specified at this point, except for the provision that it may act as a "state monitor" for the Arbitrated Loop 500.

Unresponsive communication links may occur in the Arbitrated Loop 500 for many reasons, creating what may be termed a "loop hang." For example, after loop initialization and login procedures, the FC controller 515C of the L_Port 510C "opens" the FC controller 515B of the L_Port 510B in order to transmit a sequence of data frames to L_Port 510B. However, If the FC controller 515C has not been able to receive a positive BB_Credit value from the FC controller 510B within a pre-specified time, then the communication link between the initiator and the target would enter an indeterminate state wherein a state machine associated with the FC controller 515C assumes a "Loop Opened" state, but with no authorization to transmit frames to the intended receiver, thereby creating a loop hang.

Figure 5:
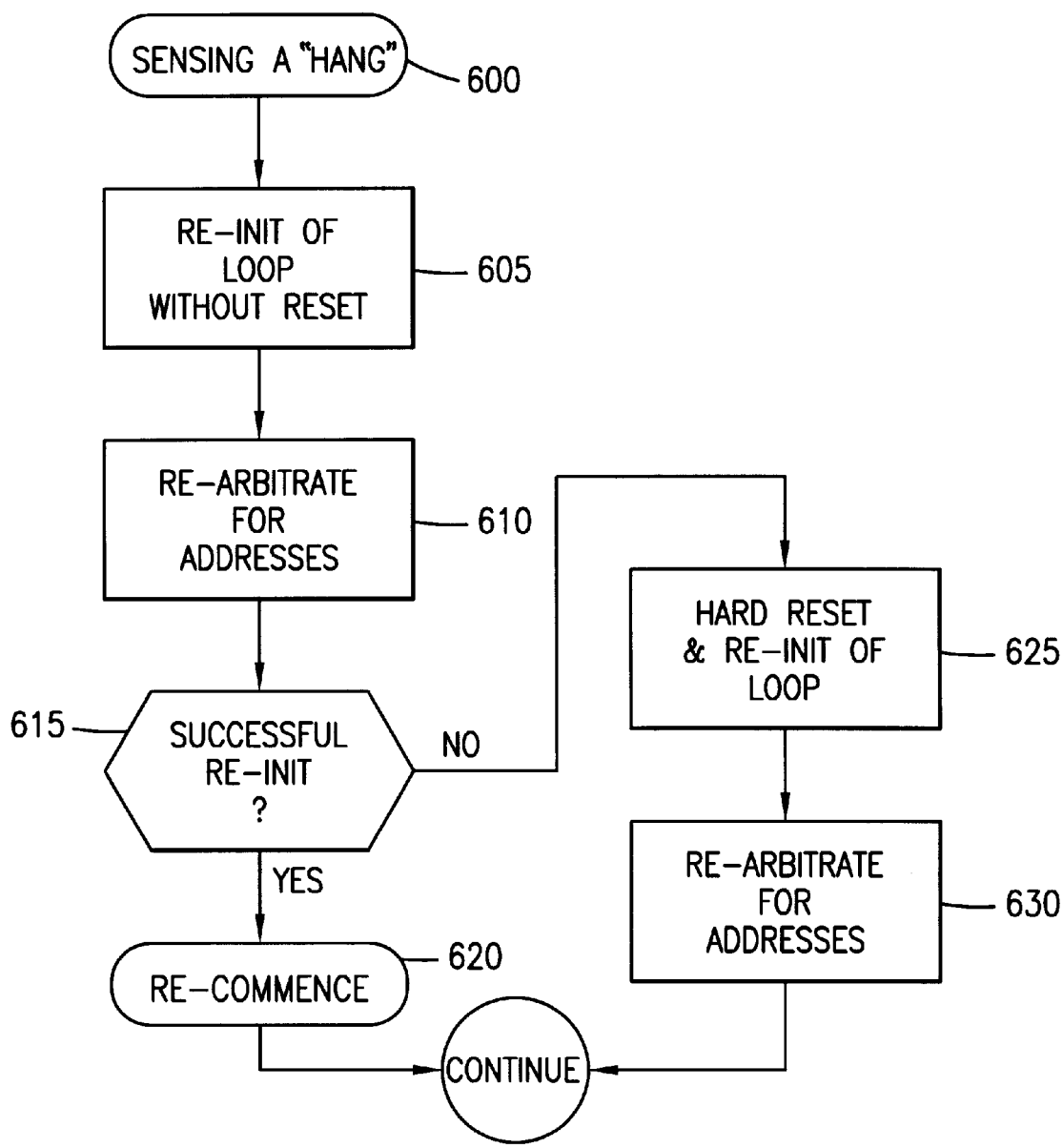
FIG. 5 depicts an exemplary flow diagram for a method of recovery from an unresponsive Arbitrated Loop in accordance with the teachings of the present invention.

FIG. 5 depicts an exemplary flow diagram for a presently preferred method of recovery from an unresponsive Arbitrated Loop condition such as, for example, the loop hang condition described above. The sensing step 600 preferably involves monitoring the state of an Arbitrated Loop at periodic intervals of time, which intervals may be predetermined. When no change in a state is detected (that is, a time-out condition) in a state machine associated with an FC controller (either initiator's or target's) during this period of time, an unresponsive loop condition or loop hang is sensed thereby.

Responsive to the sensing step 600, a loop re-initialization step 605 is effectuated, which is followed preferably by a re-arbitration step 610 for acquiring new AL_PAs for the FC devices. A determination is then made, as shown in the decision block 615, to test if the steps 605 and 610 are successfully completed. By taking the YES path from the decision block 615, the loop transaction at the time of sensing the loop hang would be re-commenced, as shown in step 620. It should be understood by those skilled in the art that in order to effectuate the re-commencement of the previous loop transaction, a loop state monitor, for example, L_Port 510A, may preferably preserve the input/output ("I/O") conditions existing at the time of sensing the loop hang.

Continuing to refer to FIG. 5, if the re-initialization step is not successful, by taking the NO path from the decision block 615, a hard reset is effected for an FC controller, for example, the controller 515A associated with the state monitor L_Port 510A, in order to exit from the loop hang situation. Further, a loop re-initialization procedure is subsequently taken. These processes are identified together in step 625. After re-arbitration for AL_PAs and prioritization (step 630), the Arbitrated Loop may engage in a new loop transaction.

It should now be appreciated by those skilled in the art that the exemplary embodiments of the present invention successfully overcome the problems of the prior art by providing an innovative mechanism for recovery from loop hang conditions present due to unresponsive communication links in an Arbitrated Loop. Although only certain embodiments of the apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, loop hang conditions may also result from such situations in the FC controllers as overflow in either out-bound or in-bound queues, or buffer-hangs associated therewith. It should be understood that the teachings of the present invention comprehend all such unresponsive Arbitrated Loop conditions.

What is claimed is:

1. In a computer system with a Fibre Channel (FC) communication environment, which environment includes a plurality of FC devices disposed in an Arbitrated Loop, each FC device comprising at least a controller, a method for managing the Arbitrated Loop, comprising the steps of:

sensing an unresponsive state associated with said Arbitrated Loop;

responsive to said sensing step, re-initializing said Arbitrated Loop; and if said re-initializing step was unsuccessful, resetting said controller and subsequently re-initializing the Arbitrated Loop.

2. The method as recited in claim 1, wherein said sensing step is performed by detecting a time-out condition in a state machine associated with said controller in a pre-determined time interval.

3. The method as recited in claim 1, wherein said re-initialization step responsive to said sensing step is followed by a step of re-commencing a loop transaction, said loop transaction being effectuated at the time of said sensing step.

4. The method as recited in claim 3, further comprising the step of preserving the input/output states associated with the Arbitrated Loop, said step of preserving being effectuated responsive to said sensing step.

5. In a computer system with a Fibre Channel (FC) communication environment, which environment includes a plurality of FC devices disposed in an Arbitrated Loop, each FC device comprising at least a controller, a system for managing the Arbitrated Loop, comprising:

sense means for sensing an unresponsive state associated with said Arbitrated Loop;

means for re-initializing said Arbitrated Loop responsive to a sense signal provided by said sense means; and reset means for resetting the controller, said reset means being actuatable upon detecting a failure condition associated with said means for re-initializing.

6. The system as recited in claim 5, wherein said sense means comprises timing means for determining a time-out condition in a state machine associated with said controller in a pre-determined time interval.

7. A method for recovering from a loop hang condition associated with an Arbitrated Loop, which Arbitrated Loop includes at least a controller, comprising the steps of:

sensing said loop hang condition by detecting a time-out condition in a state machine associated with said controller;

responsive to said sensing step, re-initializing said Arbitrated Loop to remove said loop hang condition; and resetting said controller, if said re-initialization step was not successful in removing said loop hang condition.

8. The method as recited in claim 7, wherein said re-initialization responsive to said sensing step is followed by a step of re-commencing a loop transaction, said loop transaction being effectuated at the time of said sensing step.

9. The method as recited in claim 8, further comprising the step of preserving the states associated with the Arbitrated Loop, said step of preserving being effectuated responsive to said sensing step.

* * * * *